(12) United States Patent
Wright et al.

(10) Patent No.: US 6,745,432 B2
(45) Date of Patent: Jun. 8, 2004

(54) UPRIGHT VACUUM CLEANER WITH CYCLONIC AIRFLOW

(75) Inventors: Michael F. Wright, Slow, OH (US); Charles J. Thur, Mentor, OH (US); Brett Latimer, Mentor, OH (US); Paul D. Stephens, Cleveland Heights, OH (US); Mark E. Cipolla, Chardon, OH (US); Craig J. Barbeck, North Royalton, OH (US)

(73) Assignee: Royal Appliance Mfg. Co., Glenwillow, OH (US)

( * ) Notice: Subject to any disclaimer, the term of this patent is extended or adjusted under 35 U.S.C. 154(b) by 0 days.

(21) Appl. No.: 10/271,037

(22) Filed: Oct. 15, 2002

(65) Prior Publication Data

US 2003/0037406 A1 Feb. 27, 2003

Related U.S. Application Data

(63) Continuation of application No. 09/900,557, filed on Jul. 6, 2001, now Pat. No. 6,463,622, which is a continuation of application No. 09/415,363, filed on Oct. 8, 1999, now Pat. No. 6,260,234, which is a continuation-in-part of application No. 09/216,529, filed on Dec. 18, 1998, now Pat. No. 6,070,291, which is a continuation-in-part of application No. 09/004,999, filed on Jan. 9, 1998, now Pat. No. 6,003,196.

(51) Int. Cl.[7] ................................................. A47L 9/16
(52) U.S. Cl. ............................. 15/353; 15/352; 15/350; 55/DIG. 3; 55/337; 55/429
(58) Field of Search ........................... 15/352, 353, 350; 55/DIG. 3, 337, 429

(56) References Cited

U.S. PATENT DOCUMENTS

| | | |
|---|---|---|
| 930,125 A | 8/1909 | Barrett |
| 1,003,844 A | 9/1911 | Winans |
| 1,029,562 A | 6/1912 | Prentiss |
| 1,133,543 A | 3/1915 | Duffie |

(List continued on next page.)

FOREIGN PATENT DOCUMENTS

EP 0042 723 12/1981

(List continued on next page.)

OTHER PUBLICATIONS

Fantom Vacuum Cleaner Owner's Manual (©1993).

(List continued on next page.)

*Primary Examiner*—Theresa T. Snider
(74) *Attorney, Agent, or Firm*—Fay, Sharpe, Fagan, Minnich & McKee, LLP

(57) ABSTRACT

A vacuum cleaner includes a first housing defining a cyclonic airflow chamber and a second housing defining a main suction opening that is in communication with an inlet of the cyclonic chamber. A suction source has a suction airstream inlet in communication with an outlet of the cyclonic chamber, and establishes a suction airstream that enters said main suction opening, passes through said cyclonic chamber, and passes to an outlet of said suction source. A substantial portion of particulates entrained in the suction airstream are separated therefrom when said suction airstream moves in a cyclonic fashion through the cyclonic chamber. A main filter assembly, preferably including filter medium comprising polytetrafluoroethylene (PTFE), is located in the cyclonic chamber so that a suction airstream moving from the main suction opening to the inlet of said suction source by way of the cyclonic airflow chamber passes through the filter medium thereof after said airstream moves in a cyclonic fashion within the cyclonic airflow chamber to remove residual particulates from the suction airstream before it leaves the cyclonic chamber. A HEPA filter can be provided to filter the suction airstream exhausted through the outlet of the suction source prior to the airstream being discharged from the vacuum.

27 Claims, 15 Drawing Sheets

U.S. PATENT DOCUMENTS

| | | | |
|---|---|---|---|
| 1,167,219 A | 1/1916 | Replogle | |
| 1,230,827 A | 6/1917 | Duffie | 15/351 |
| 1,234,095 A | 7/1917 | Duffie | 15/351 |
| 1,768,617 A | 7/1930 | Lee | |
| 1,887,600 A | 11/1932 | Replogle | |
| 2,019,895 A | 11/1935 | Dow | |
| 2,171,248 A | 8/1939 | Van Berkel | 55/392 |
| 2,187,164 A | 1/1940 | Leathers | 15/352 X |
| 2,266,075 A | 12/1941 | Replogle | |
| 2,316,836 A | 4/1943 | Breuer | 55/337 |
| 2,394,923 A | 2/1946 | Little | 55/337 |
| 2,475,808 A | 7/1949 | Storm, Jr. | |
| 2,507,897 A | 5/1950 | Gavagnin | 96/318 |
| 2,516,707 A | 7/1950 | Lewyt et al. | 55/379 |
| 2,524,117 A | 10/1950 | Storm, Jr. | |
| 2,542,634 A | 2/1951 | Davis et al. | |
| 2,564,339 A | 8/1951 | Nerheim | 15/352 X |
| 2,643,733 A | 6/1953 | Shellman | 55/429 X |
| 2,921,646 A | 1/1960 | Poole | 55/327 |
| 3,177,635 A | 4/1965 | Cawl et al. | 96/421 |
| 3,320,727 A | 5/1967 | Farley | 55/337 |
| 3,413,779 A | 12/1968 | Takahashi et al. | 55/426 X |
| 3,543,325 A | 12/1970 | Hamrick | |
| 3,614,860 A | 10/1971 | Grellsson | 15/347 |
| 3,626,545 A | 12/1971 | Sparrow | |
| 3,797,064 A | 3/1974 | MacFarland | 15/351 |
| 3,820,310 A | 6/1974 | Fromknecht et al. | 55/447 |
| 3,853,518 A | 12/1974 | Tu et al. | 55/337 |
| 3,910,781 A | 10/1975 | Bryant, Jr. | 55/305 |
| 4,072,483 A | 2/1978 | Doyle, Jr. | 55/372 |
| 4,108,778 A | 8/1978 | Lambert et al. | 210/297 |
| 4,118,208 A | 10/1978 | Klinedinst | 55/433 |
| 4,172,710 A | 10/1979 | van der Molen | 55/340 |
| 4,198,726 A | 4/1980 | Powell, Jr. | 15/312.2 |
| 4,268,288 A | 5/1981 | Coombs | 55/337 |
| 4,276,070 A | 6/1981 | Hug | 55/429 |
| 4,284,422 A | 8/1981 | Ferland | 55/300 |
| 4,355,434 A | 10/1982 | Gongwer | 15/327.1 |
| 4,373,228 A | 2/1983 | Dyson | 15/350 |
| 4,426,211 A | 1/1984 | Ataka et al. | 15/352 X |
| 4,443,235 A | 4/1984 | Brenholt et al. | 96/408 |
| 4,457,043 A | 7/1984 | Oeberg et al. | 15/346 |
| 4,486,206 A | 12/1984 | Miyakawa et al. | 55/337 |
| 4,571,772 A | 2/1986 | Dyson | 15/335 |
| 4,573,236 A | 3/1986 | Dyson | 15/333 |
| 4,581,787 A | 4/1986 | Torigoe et al. | 15/351 |
| 4,593,429 A | 6/1986 | Dyson | 15/353 |
| 4,643,748 A | 2/1987 | Dyson | 55/338 |
| 4,665,582 A | 5/1987 | Richmond et al. | 15/352 X |
| 4,718,924 A | 1/1988 | DeMarco | 55/302 |
| RE32,751 E | 9/1988 | Joss et al. | 15/350 |
| 4,769,052 A | 9/1988 | Kowalski | 55/379 |
| 4,826,515 A | 5/1989 | Dyson | 55/345 |
| 4,853,008 A | 8/1989 | Dyson | 55/345 |
| 4,853,011 A | 8/1989 | Dyson | 355/345 |
| 4,934,019 A | 6/1990 | Shorthill et al. | 15/339 |
| 4,944,780 A | 7/1990 | Usmani | 55/337 |
| 4,960,446 A | 10/1990 | Werner et al. | 15/352 X |
| 4,967,443 A | 11/1990 | Krasznai et al. | 15/350 |
| 5,018,240 A | 5/1991 | Holman | 15/352 X |
| 5,020,186 A | 6/1991 | Lessig et al. | 15/351 X |
| 5,062,870 A | 11/1991 | Dyson | 96/400 |
| 5,078,761 A | 1/1992 | Dyson | 96/400 |
| 5,080,697 A | 1/1992 | Finke | |
| 5,090,975 A | 2/1992 | Requejo et al. | 134/21 |
| 5,090,976 A | 2/1992 | Dyson | 55/337 |
| 5,101,532 A | 4/1992 | Dyson et al. | 15/320 |
| 5,106,488 A | 4/1992 | Jonasson | |
| 5,107,567 A | 4/1992 | Ferrari et al. | 15/352 |
| 5,129,125 A | 7/1992 | Gamou et al. | 15/352 |
| 5,135,552 A | 8/1992 | Weistra | 55/337 |
| 5,145,499 A | 9/1992 | Dyson | 55/337 |
| 5,160,356 A | 11/1992 | Dyson | 55/345 |
| 5,230,722 A | 7/1993 | Yonkers | 55/337 |
| 5,248,323 A | 9/1993 | Stevenson | 95/90 |
| 5,254,147 A | 10/1993 | Finke | 15/353 |
| 5,267,371 A | 12/1993 | Soler et al. | 15/327.5 |
| 5,271,751 A | 12/1993 | Lagler | 55/295 |
| 5,287,591 A | 2/1994 | Rench et al. | 15/328 |
| 5,307,538 A | 5/1994 | Rench et al. | 15/352 |
| 5,427,597 A | 6/1995 | Osendorf | 55/487 |
| 5,464,460 A | 11/1995 | Bosses | 55/374 |
| 5,524,321 A | 6/1996 | Weaver et al. | 15/329 |
| 5,558,697 A | 9/1996 | Dyson et al. | 95/12 |
| 5,593,479 A | 1/1997 | Frey et al. | 96/57 |
| 5,603,741 A | 2/1997 | Frey | 55/368 |
| 5,659,922 A | 8/1997 | Louis | 15/352 |
| 5,685,894 A | 11/1997 | Bowerman et al. | 96/63 |
| 5,704,956 A | 1/1998 | Loveless et al. | 55/305 |
| 5,725,623 A | 3/1998 | Bowerman et al. | |
| 5,746,795 A | 5/1998 | Witter | 55/337 |
| 5,779,745 A | 7/1998 | Kilstrom | 55/337 |
| 5,795,358 A | 8/1998 | Scanlon et al. | 55/320 |
| D398,097 S | 9/1998 | Murphy et al. | D32/22 |
| 5,829,090 A | 11/1998 | Melito et al. | 15/352 |
| 5,867,863 A | 2/1999 | McCormick | 15/351 |
| 5,922,093 A | 7/1999 | James et al. | 55/322 |
| 5,935,279 A | 8/1999 | Kilstrom | 15/350 |
| 5,946,771 A | 9/1999 | Bosyj et al. | 15/347 |
| 5,961,677 A | 10/1999 | Scott | 55/385.1 |
| 6,012,200 A | 1/2000 | Murphy et al. | 15/352 X |
| 6,035,486 A | 3/2000 | McCormick | 15/352 |
| 6,070,291 A | 6/2000 | Bair et al. | 15/347 |
| 6,085,382 A | 7/2000 | Bobrosky et al. | 15/350 |
| 6,146,434 A | 11/2000 | Scalfani et al. | 15/353 |
| 6,192,550 B1 | 2/2001 | Hamada et al. | 15/352 |
| 6,256,834 B1 | 7/2001 | Meijer et al. | 15/352 |
| 6,463,622 B2 * | 10/2002 | Wright et al. | 15/353 |

FOREIGN PATENT DOCUMENTS

| | | |
|---|---|---|
| EP | 0 489 468 A1 | 6/1992 |
| FR | 1468142 | 4/1967 |
| GB | 479455 | 2/1938 |
| GB | 1049292 | 2/1964 |
| GB | 1111074 | 4/1968 |
| GB | 2265096 A | 9/1993 |
| GB | 2280388 A | 2/1995 |
| GB | 2 298 598 | 9/1996 |
| WO | WO84 02282 A | 6/1984 |
| WO | WO 99/30602 | 6/1999 |
| WO | WO 99/30604 | 6/1999 |
| WO | WO 99/30605 | 6/1999 |

OTHER PUBLICATIONS

Fantom Fury Vacuum Cleaner Owner's Manual (©1995).
Fantom Vacuum Cleaner Service Manual for Iona ® Model Series F–9000.
Japanese Language Brochure Concerning National Product No. MC—110U, Feb. 1981.

* cited by examiner

UPRIGHT VACUUM CLEANER WITH CYCLONIC AIRFLOW

This application is a continuation of U.S. Ser. No. 09/900,557 filed Jul. 6, 2001 now U.S. Pat. No. 6,463,622, which is a continuation of U.S. Ser. No. 09/415,363 filed Oct. 8, 1999, now U.S. Pat. No. 6,260,234 B1, which is a continuation-in-part of U.S. Ser. No. 09/216,529 filed Dec. 18, 1998, now U.S. Pat. No. 6,070,291, which is a continuation-in-part of U.S. Ser. No. 09/004,999 filed Jan. 9, 1998, now U.S. Pat. No. 6,003,196.

BACKGROUND OF THE INVENTION

The present invention relates to vacuum cleaners. More particularly, the present invention relates to upright vacuum cleaners used for suctioning dirt and debris from carpets and floors.

Upright vacuum cleaners are ubiquitous. They are known to include an upper portion having a handle, by which an operator of the vacuum cleaner may grasp and maneuver the cleaner, and a lower cleaning nozzle portion which travels across a floor, carpet, or other surface being cleaned. The upper portion is often formed as a rigid plastic housing which encloses a dirt and dust collecting filter bag, although the upper portion may simply be an elongated handle with the filter bag, and an external cloth bag, being hung therefrom. The cleaning nozzle is hingedly connected to the upper handle portion such that the upper portion is pivotable between a generally vertical upright storage position and an inclined operative position. The underside of the nozzle includes a suction opening formed therein which is in fluid communication with the filter bag.

A vacuum or suction source such as a motor and fan assembly is enclosed either within the nozzle portion or the upper portion of the cleaner. The vacuum source generates the suction required to pull dirt from the carpet or floor being vacuumed through the suction opening and into the filter bag. A rotating brush assembly is typically provided in proximity with the suction opening to loosen dirt and debris from the surface being vacuumed.

To avoid the need for vacuum filter bags, and the associated expense and inconvenience of replacing the bag, another type of upright vacuum cleaner utilizes cyclonic airflow, rather than a filter bag, to separate a majority of the dirt and other particulates from the suction airstream. The air is then filtered to remove residual particulates, returned to the motor, and exhausted.

Such prior cyclonic airflow upright vacuum cleaners have not been found to be entirely effective and convenient to use. For example, with these prior cyclonic airflow vacuum cleaners, the process of emptying dust and dirt from the cyclonic chamber dirt collection container has been found to be inconvenient, and often resulted in the spillage of the cup contents. Likewise, with these prior units, replacement of the filter element has not been convenient. Other cyclonic airflow vacuum cleaners have been found to exhaust air which is not free of residual contaminants. For example, one prior unit filters the airstream after it passes through the cyclonic chamber, but thereafter passes the airstream through the motor assembly where it is potentially recontaminated by the motor assembly, itself, prior to its being exhausted into the atmosphere.

Because the cyclonic action of such vacuum cleaners does not completely remove all dust, dirt, and other contaminants from the suction airstream, it is necessary to include a filter downstream from the cyclonic chamber. As such, prior cyclonic airflow vacuum cleaners have heretofore included conventional, non-washable filter elements including a conventional filtering medium to filter the airstream after it passes through the cyclonic chamber. These prior filter elements have caused considerable difficulties. A conventional filter that is sufficiently fine to filter the airstream effectively unduly restricts airflow and decreases the effectiveness of the cyclonic action. On the other hand, a coarse filter does not effectively filter the airstream of residual contaminants. Further, conventional filter media, such as paper or fibrous media, has been found to clog readily, thereby unduly decreasing airflow rates over time. Thus, a need has been found for a cyclonic airflow vacuum cleaner with an effective filter positioned in the cyclonic chamber for effectively filtering the airstream without clogging. Further, a need has been found for such a vacuum cleaner including a washable, re-usable filter element from which dirt is easily extracted.

Accordingly, it has been deemed desirable to develop a new and improved upright vacuum cleaner that would overcome the foregoing difficulties and others while providing better and more advantageous overall results.

SUMMARY OF THE INVENTION

In accordance with a first aspect of the present invention, an upright vacuum cleaner includes an upright housing and a nozzle base hingedly interconnected with the upright housing. The nozzle base includes a main suction opening in its underside. A cyclonic airflow chamber is defined in the upright housing and is adapted for separating dust and dirt from a cyclonically circulating suction airstream. The main suction opening is in fluid communication with the cyclonic airflow chamber. A suction source is located in the upright housing or nozzle base and has a suction airflow inlet in fluid communication with the cyclonic chamber, and also includes a suction airflow outlet. A main filter assembly is located in the cyclonic chamber upstream from the suction source for filtering dust and dirt from a suction airstream that passes through the cyclonic airflow chamber. The main filter element extends upwardly within the cyclonic airflow chamber from a floor of a dirt container portion of said housing that defines a lower portion of the cyclonic airflow chamber and that is adapted for receiving and retaining dirt and dust separated from the suction airstream. A conduit depends into the cyclonic airflow chamber from an upper wall of the housing, and the conduit is axially aligned and mates with an upper end of the main filter assembly whereby the main filter assembly and the conduit together define a hollow column structure in the cyclonic airflow chamber.

In accordance with another aspect of the present invention, a vacuum cleaner comprises a first housing member defining a cyclonic airflow chamber adapted for separating entrained dirt and dust from a circulating airstream, and a second housing member defining a main suction opening. A first conduit fluidically connects the main suction opening to an inlet of the cyclonic airflow chamber. A suction source has a suction airstream inlet and a suction airstream outlet, and it is adapted for generating and maintaining a suction airstream flowing from the inlet downstream to the outlet. A second conduit fluidically connects an outlet of the cyclonic airflow chamber to the suction airstream inlet of the suction source. A main filter assembly includes a filter medium comprising a selectively permeable plastic material, and the main filter assembly is located in the cyclonic chamber so that a suction airstream moving from the main suction opening to the inlet of the suction source by way of the cyclonic airflow chamber passes through the filter medium after the airstream moves in a cyclonic fashion within the cyclonic airflow chamber.

In accordance with still another aspect of the present invention, a vacuum cleaner apparatus includes a nozzle defining a main suction opening, and a main suction source in communication with the main suction opening. The main suction source is adapted for establishing a suction airstream that moves into the main suction opening and downstream into the suction source. A cyclonic chamber is placed in communication with and between the main suction opening and the suction source, and the cyclonic chamber is adapted for imparting a cyclonic flow to the suction airstream whereby a portion of particulates entrained in the suction airstream are separated therefrom, leaving residual particulates entrained in the suction airstream. A filter assembly is located in the cyclonic chamber and includes a filter membrane placed in covering relation with an outlet of the cyclonic chamber. Residual particulates entrained in the suction airstream are blocked from exiting the cyclonic chamber by the filter membrane, and the filter assembly adapted for being selectively removed from the cyclonic chamber, washed to remove particulates from the membrane, and replaced in the cyclonic chamber for further filtering operations.

In accordance with yet another aspect of the present invention, a vacuum cleaner comprises a housing defining a cyclonic airflow chamber for separating contaminants from a suction airstream. The housing further defines a suction airstream inlet and a suction airstream outlet in fluid communication with the cyclonic airflow chamber. A nozzle base includes a main suction opening fluidically connected with the cyclonic airflow chamber inlet. An airstream suction source has an inlet fluidically connected to the cyclonic airflow chamber outlet and a suction source exhaust outlet. The suction source selectively establishes and maintains a suction airstream from the nozzle main suction opening to the suction source exhaust outlet. A main filter assembly is positioned in fluid communication between the cyclonic airflow chamber and the suction source and is adapted for filtering residual contaminants from the suction airstream downstream relative to the cyclonic airflow chamber. The main filter assembly comprising a polymeric filter membrane.

One advantage of the present invention is the provision of a new and improved vacuum cleaner.

Another advantage of the invention is found in the provision of a vacuum cleaner with a cyclonic airflow chamber through which the suction airstream flows for separating dust and dirt from the airstream and for depositing the separated dust and dirt into an easily and conveniently emptied dirt cup.

Still another advantage of the present invention resides in the provision of a cyclonic airflow upright vacuum cleaner with a main filter that effectively filters residual contaminants from the suction airstream between the cyclonic airflow chamber and the motor assembly without unduly restricting airflow and without premature clogging. Yet another advantage of the invention is the provision of a cyclonic airflow upright vacuum cleaner with a final filter located downstream from the suction motor assembly for filtering the suction airstream immediately prior to its exhaustion into the atmosphere.

A further advantage of the invention is the provision of a vacuum cleaner with a main filter, an auxiliary filter, and a final filter wherein the main, auxiliary, final filters are easily removable and replaceable.

A still further advantage of the present invention is the provision of a vacuum cleaner with a cyclonic airflow chamber and main filter element, wherein the main filter element is positioned in a removable dirt cup partially defining the cyclonic airflow chamber for ease of emptying the dirt cup and cleaning the filter.

A yet further advantage of the present invention resides in the provision of a vacuum cleaner with a cyclonic airflow chamber and a main filter assembly situated in the cyclonic airflow chamber, wherein the main filter assembly includes a re-usable filter element that is easily and repeatedly cleanable by washing.

Still other benefits and advantages of the invention will become apparent to those skilled in the art upon reading and understanding the following detailed description.

BRIEF DESCRIPTION OF THE DRAWINGS

The invention may take form in certain components and structures, preferred embodiments of which will be illustrated in the accompanying drawings wherein.

DETAILED DESCRIPTION OF THE PREFERRED EMBODIMENTS

Figure 1:
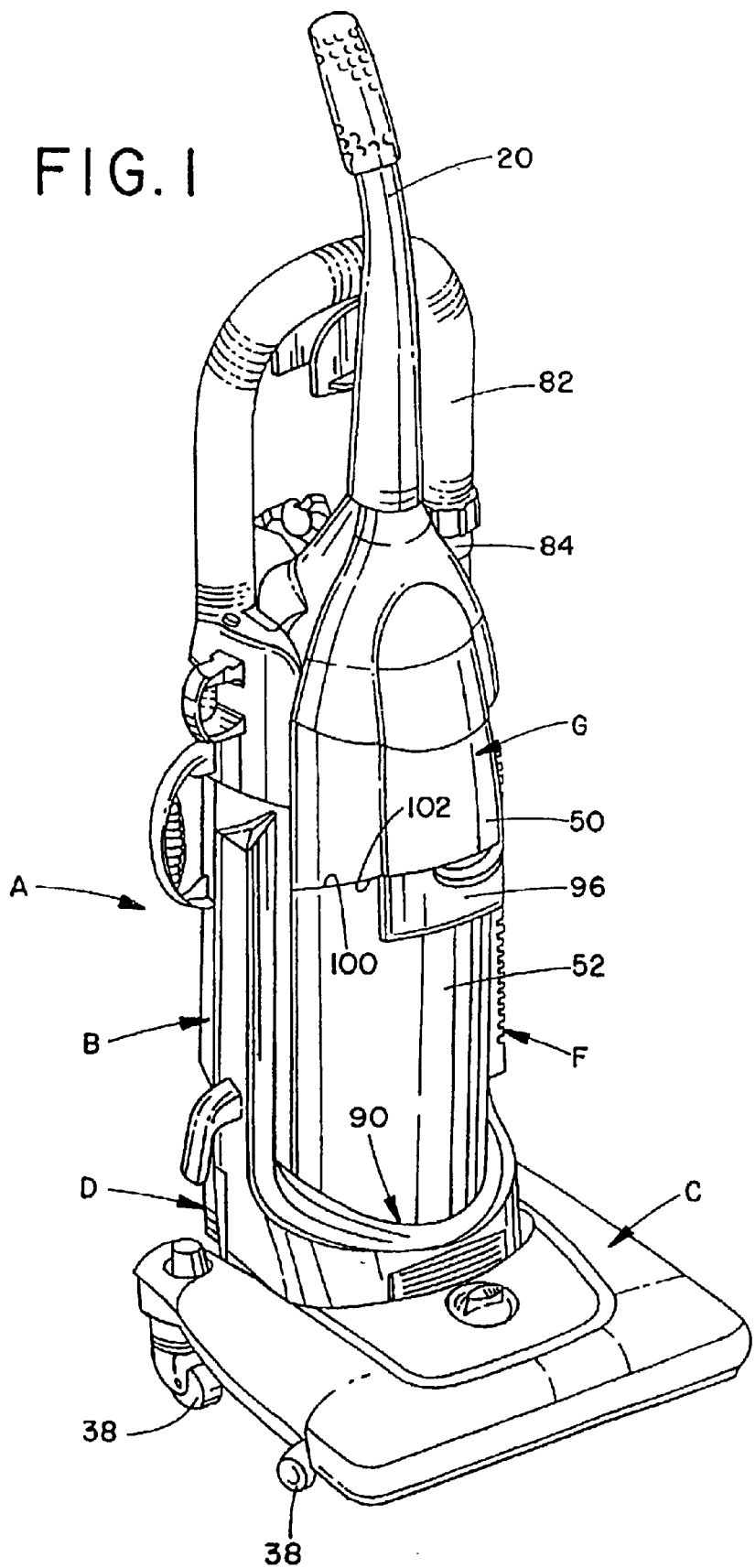
FIG. 1 is a perspective view illustrating a cyclonic airflow upright vacuum cleaner in accordance with the present invention.
Figure 2:
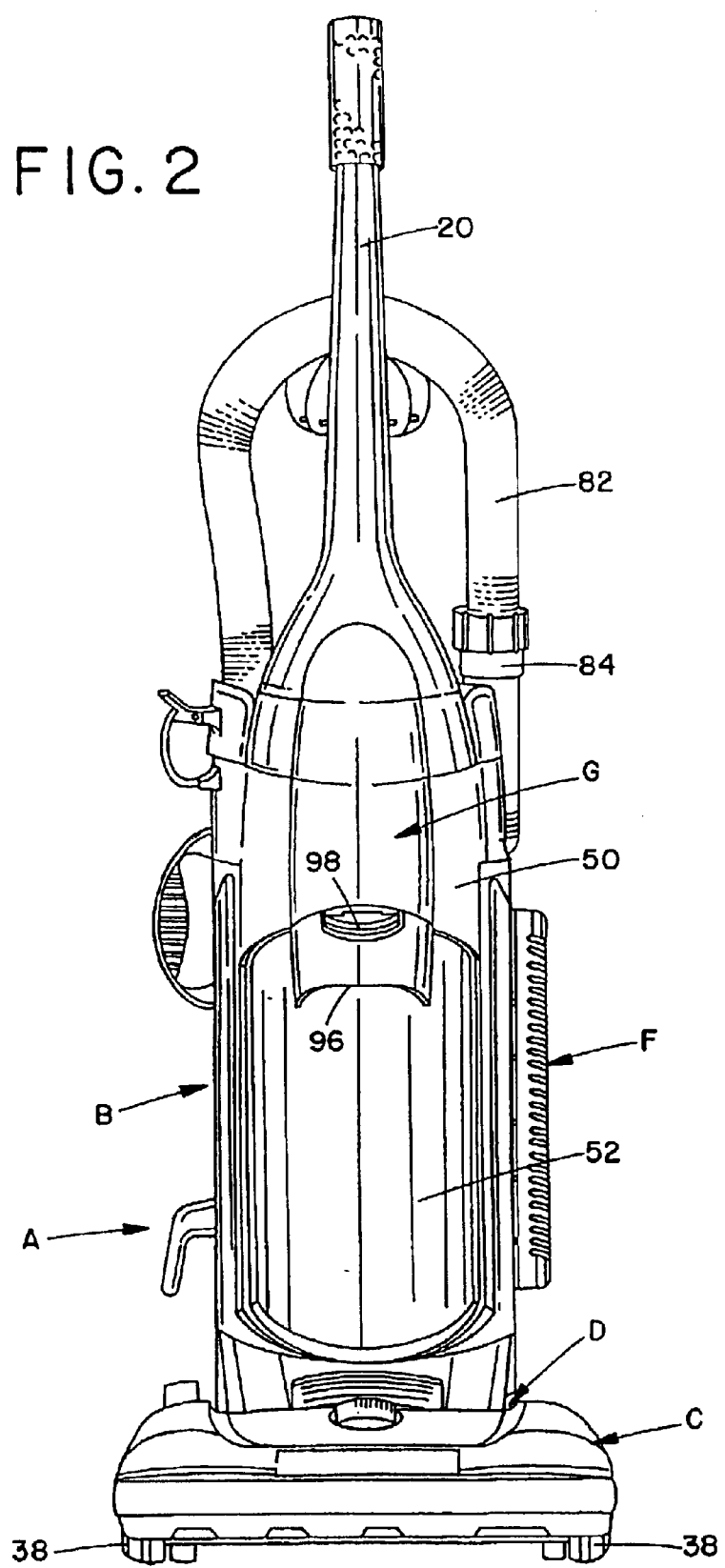
FIG. 2 is a front elevational view of the vacuum cleaner illustrated in FIG. 1.
Figure 3:
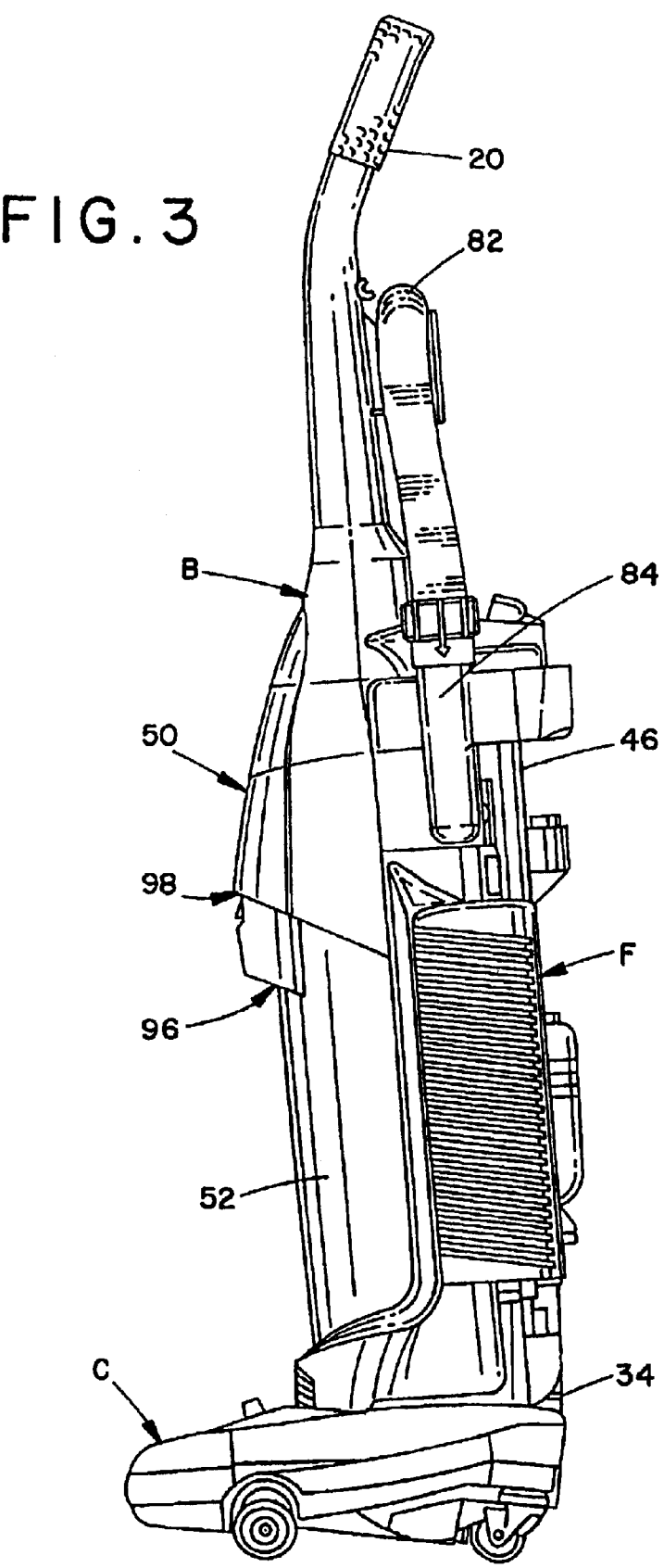
FIGS. 3 and 4 are left and right side elevational views, respectively, of the vacuum cleaner shown in FIG. 1.
Figure 4:
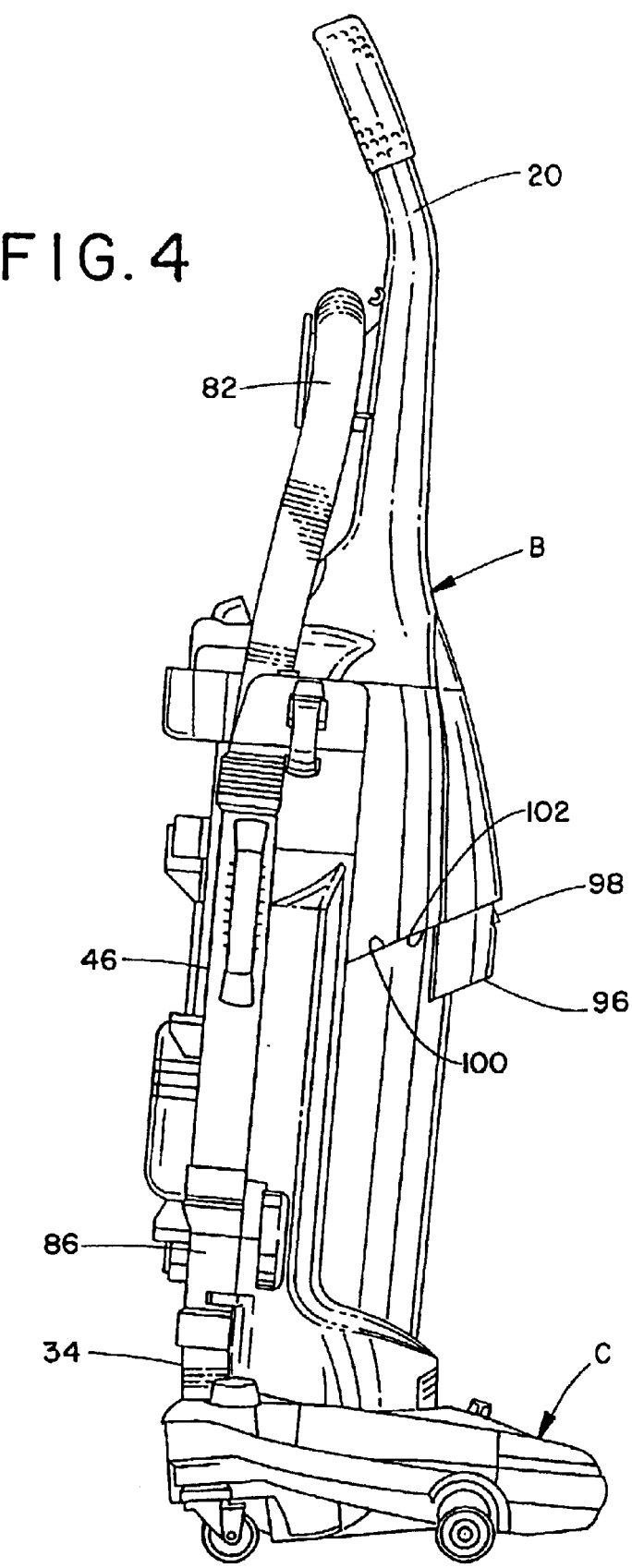

Referring now to the FIGURES, wherein the showings are for purposes of illustrating a preferred embodiment of the invention only and not for purposes of limiting the same, FIGS. 1–6 illustrate an upright vacuum cleaner A including an upright housing section B and a nozzle base section C. The sections B,C are pivotally or hingedly connected through the use of trunnions or another suitable hinge assembly D so that the upright housing section B pivots between a generally vertical storage position (as shown) and an inclined, operative position. Both the upright and nozzle sections B,C are preferably made from conventional materials such as molded plastics and the like. The upright section B includes a handle 20 extending upward therefrom by which an operator of the vacuum A is able to grasp and maneuver the vacuum.

During vacuuming operations, the nozzle base C travels across the floor, carpet, or other subjacent surface being cleaned. The underside 24 (FIG. 6) of the nozzle base includes a main suction opening 26 formed therein that extends substantially across the width of the nozzle base C at the front end thereof, the main suction opening 26 is in fluid communication with the vacuum upright body section B through a passage 30 and a connector hose assembly 34 (see also FIG. 5) or a like conduit. A rotating brush assembly 36 is positioned in the region of the nozzle main suction opening 26 for contacting and scrubbing the surface being vacuumed to loosen embedded dirt and dust. A plurality of wheels 38 support the nozzle base on the surface being cleaned and facilitate its movement thereacross.

Figure 5:
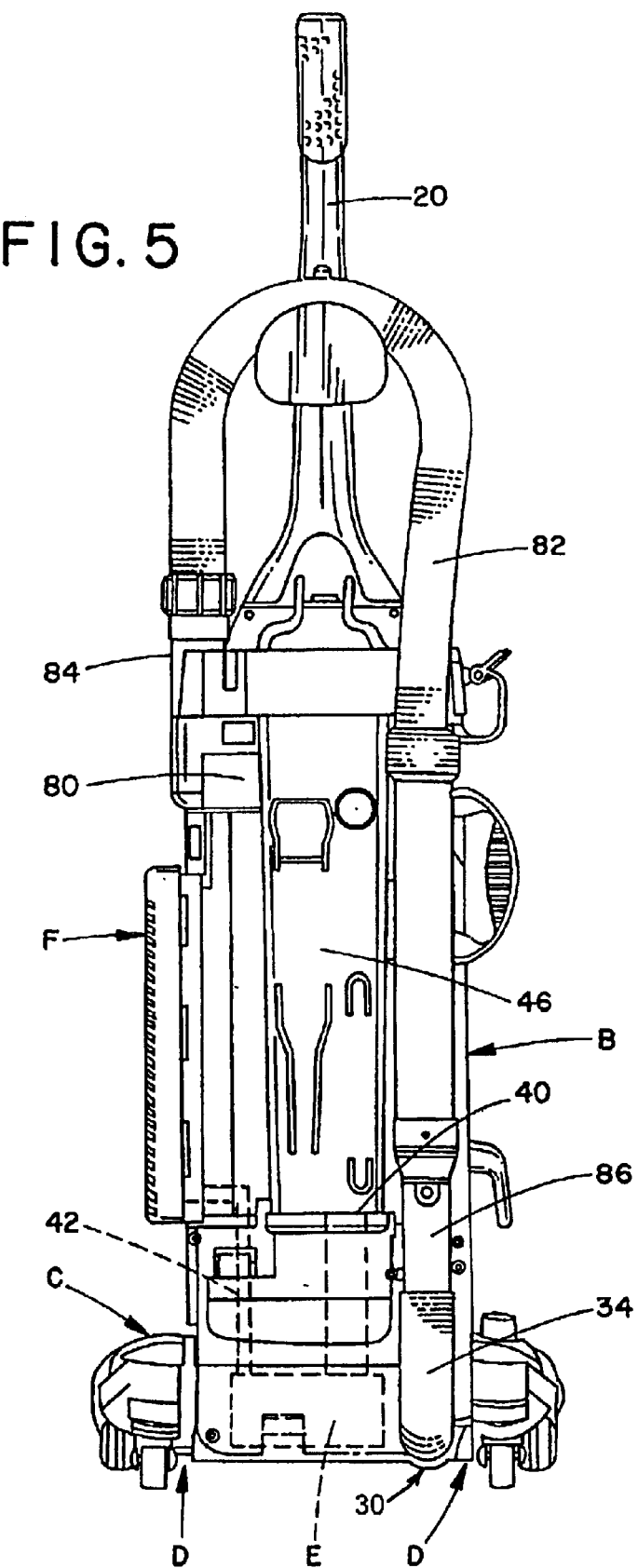
FIG. 5 is a rear elevational view of the vacuum cleaner of FIG. 1.
Figure 6:
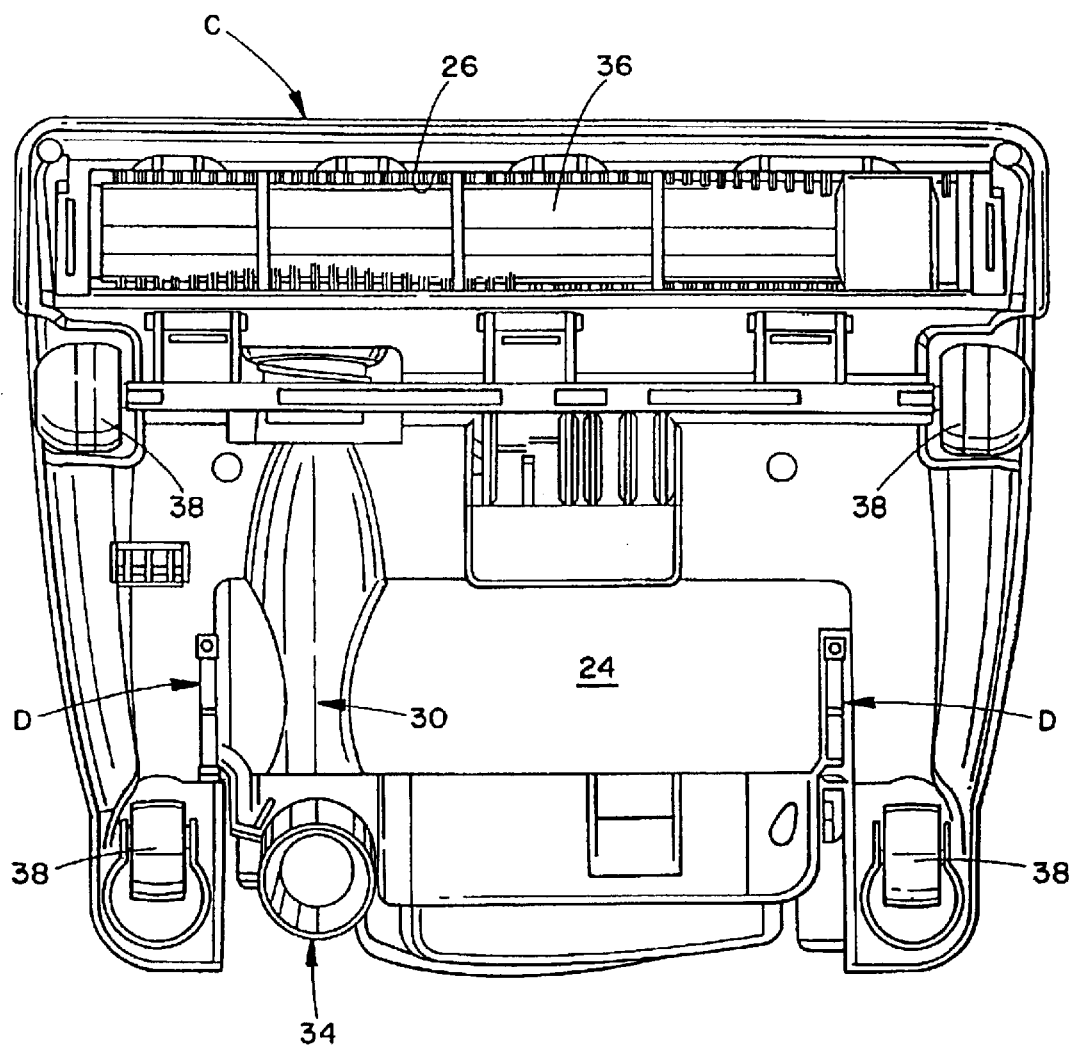
FIG. 6 is a bottom plan view of the vacuum cleaner of FIG. 1.
Figure 9:
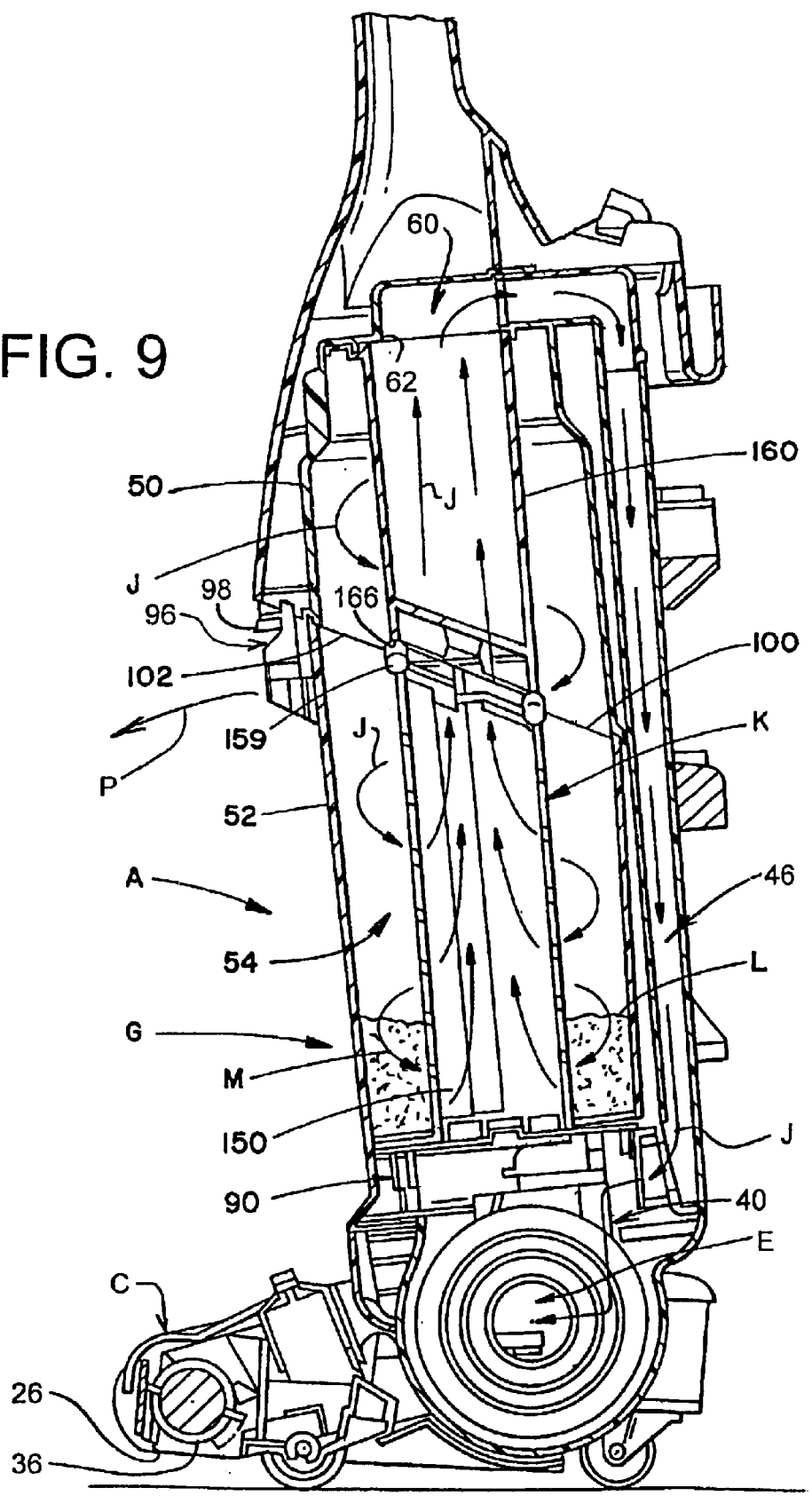
FIG. 9 is a side elevational view in cross-section of a vacuum cleaner with cyclonic airflow in accordance with a preferred embodiment of the present invention showing suction airflow through the cyclonic airflow dust and dirt separating chamber.

The upright vacuum cleaner A includes a vacuum or suction source for generating the required suction airflow for cleaning operations. With reference particularly to FIGS. 5 and 9, a suitable suction source, such as an electric motor and fan assembly E, generates a suction force in a suction inlet 40 and an exhaust force in an exhaust outlet 42. The exhaust outlet 42 of the motor assembly is in fluid communication with a downstream final filter assembly F for filtering residual contaminants from the airstream exhausted by the motor assembly immediately prior to discharge of the exhaust airstream into the atmosphere. The suction inlet 40 of the motor assembly E is in fluid communication with an upstream elongated suction conduit 46 that extends upwardly from the motor/fan assembly E to an upper region of the upright section B where it communicates with the cyclonic suction airflow dust and dirt separating region G of the vacuum A to generate a suction force therein.

Figure 7:
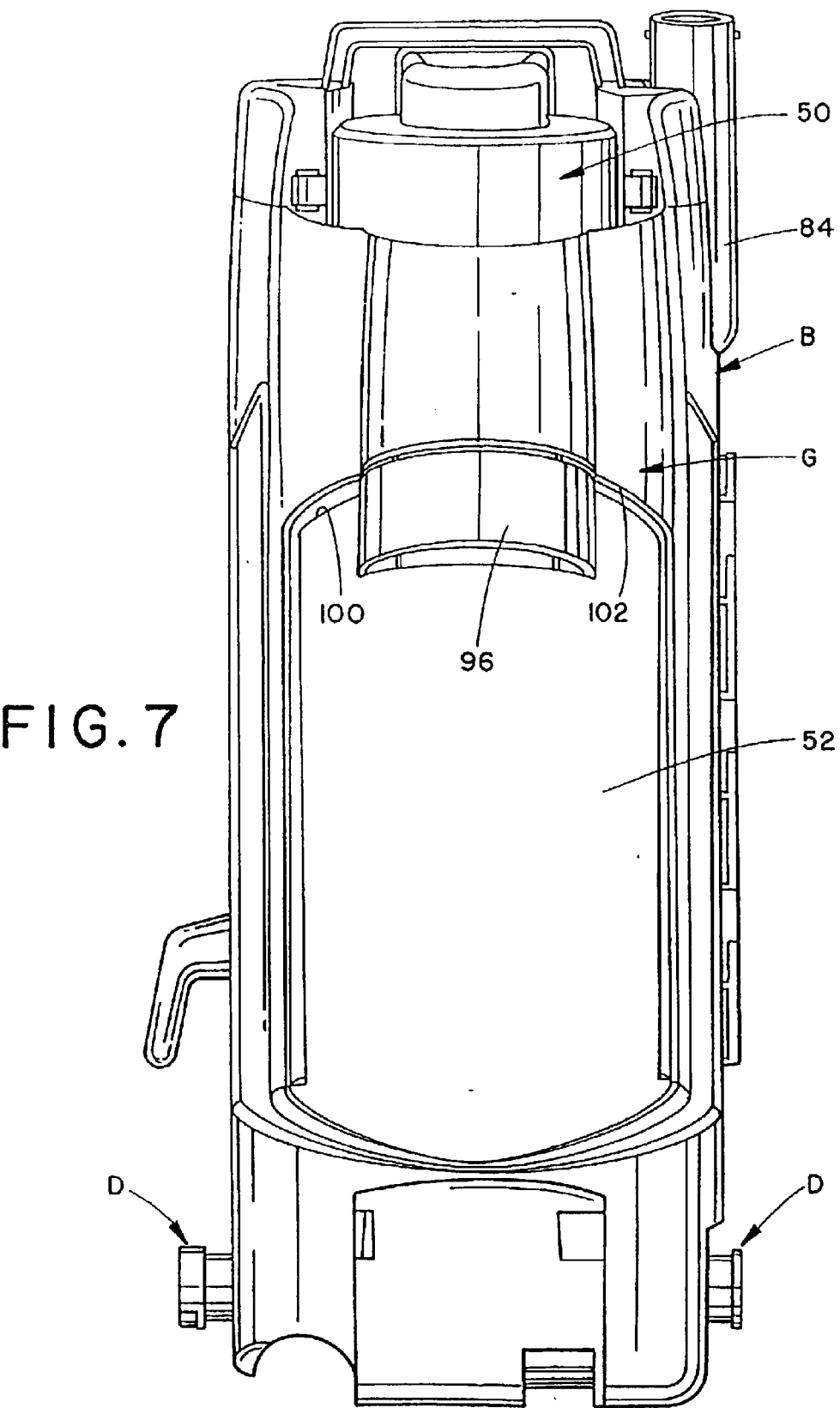
FIG. 7 is a front elevational view of the upright housing portion of the vacuum cleaner of FIG. 1.

With reference now particularly to FIGS. 7 and 9, the cyclonic suction airflow dust and dirt separating region G housed in the upright section B includes and is defined by an upper housing assembly 50 and a mating dust and dirt cup or container 52. These sections 50,52 together define a generally cylindrical cyclonic airflow chamber 54. The upper housing section 50 includes a suction airflow outlet passage 60 that communicates with the cyclonic chamber 54 through an aperture 62. The outlet passage 60 also communicates with the motor/fan assembly E by way of the elongated suction conduit 46. FIG. 9 shows that the elongated suction conduit 46 extends from the motor/fan assembly E upward to communicate with the upper housing suction outlet passage 60 so that the suction inlet of the motor/fan assembly E is able to fluidically communicate with the cyclonic chamber 54. It is preferred that the aperture 62 be centrally located in the cyclonic chamber 54.

The dirt cup or container 52 defining the lower portion of the cyclonic airflow dust and dirt separating chamber 54 is constructed for large capacity and ease of emptying the contents as necessary. The dirt container 52 defines over half the total volume of the cyclonic chamber 54. The capacity of the container 52 is maximized to lengthen the operational time before the dirt container 52 must be emptied. Furthermore, the dirt container 52 is preferably at least partially transparent so that an operator of the vacuum is able to view the level of dirt and dust L accumulated therein for purposes of determining when the container should be emptied.

The dirt container 52 is connected to the vacuum upright section B through use of a hinge assembly 90 that allows the dirt container 52 to pivot (as indicated by the arrow P) between the illustrated closed, operative position and an open forwardly tilted position. Once the dirt container 52 is pivoted into its open position, it may be pulled upward and away from the section B and separated therefrom for ease of emptying the dirt container. A handle 96 is provided on the exterior of the container 52 to facilitate operator movement of the container between the open and closed positions, and a resiliently biased latch 98 retains the dirt container in the closed position for vacuuming operations.

The dirt container upper edge 100 defining an open upper end of the container 52 is preferably inclined downwardly in the direction away from the handle 96 or front of the container 52. The upper housing section 50 is formed with a complimentary mating inclined lower edge 102, and a seal such as a gasket or other structure (not shown) is preferably provided between the edges 100,102 to prevent air leakage into the cyclonic airflow chamber 54. The inclined upper edge 100 of the dirt container 52 also ensures that, when the container is pivoted to the open position, the upper edge 100 lies in a substantially horizontal plane. Therefore, the contents of the container are much less likely to spill when the container is opened during emptying operations. Preferably, the angle at which the upper edge 100 is inclined from horizontal is selected, in combination with the maximum distance the container is able to be pivoted on the arc P when opened, such that when the container is fully opened, the upper edge lies in a substantially horizontal plane.

Figure 13:
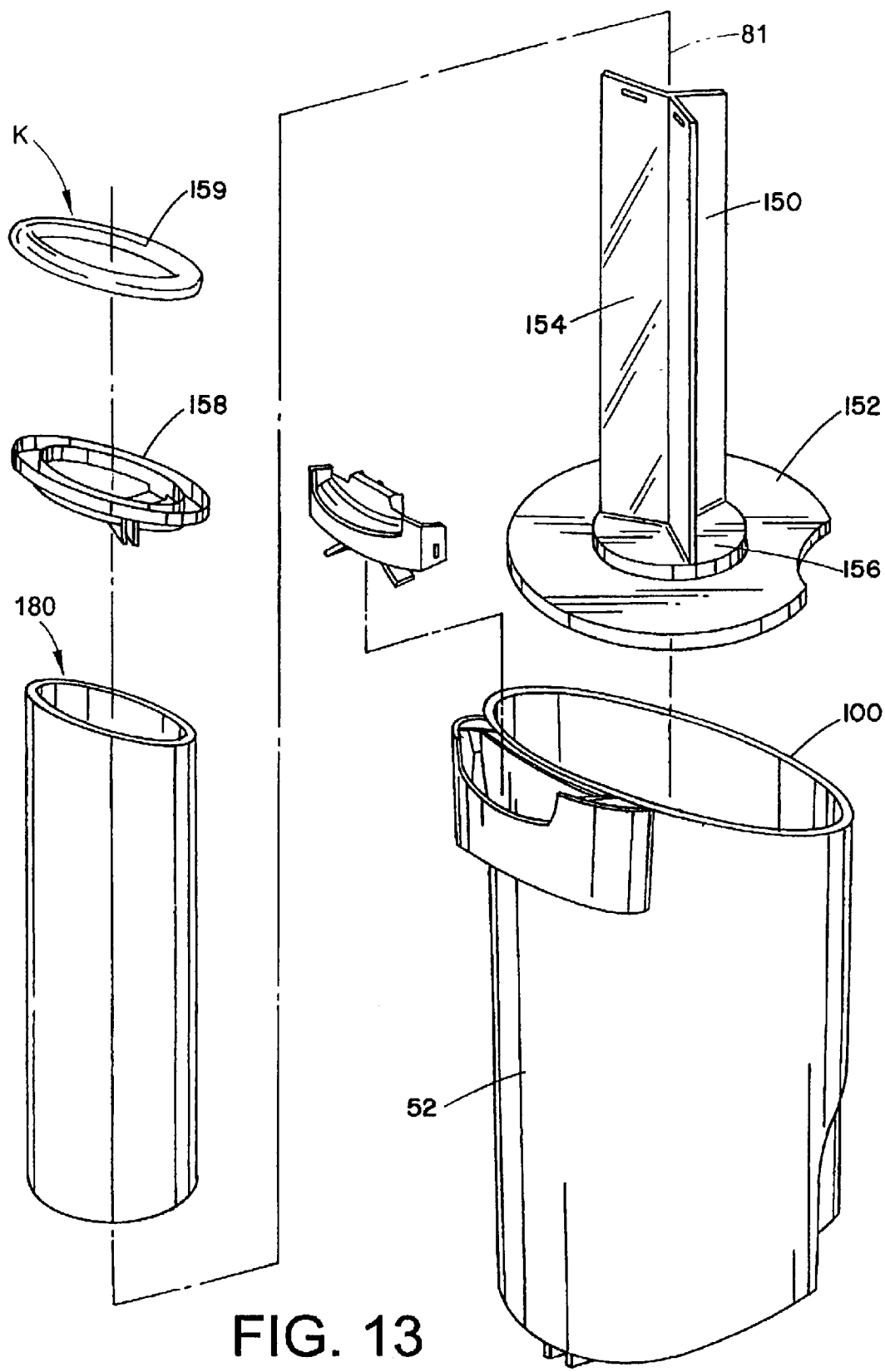
FIG. 13 is an exploded perspective view of a dirt cup, main filter assembly, and filter mount means as employed in the vacuum cleaner of FIG. 9.
Figure 14:
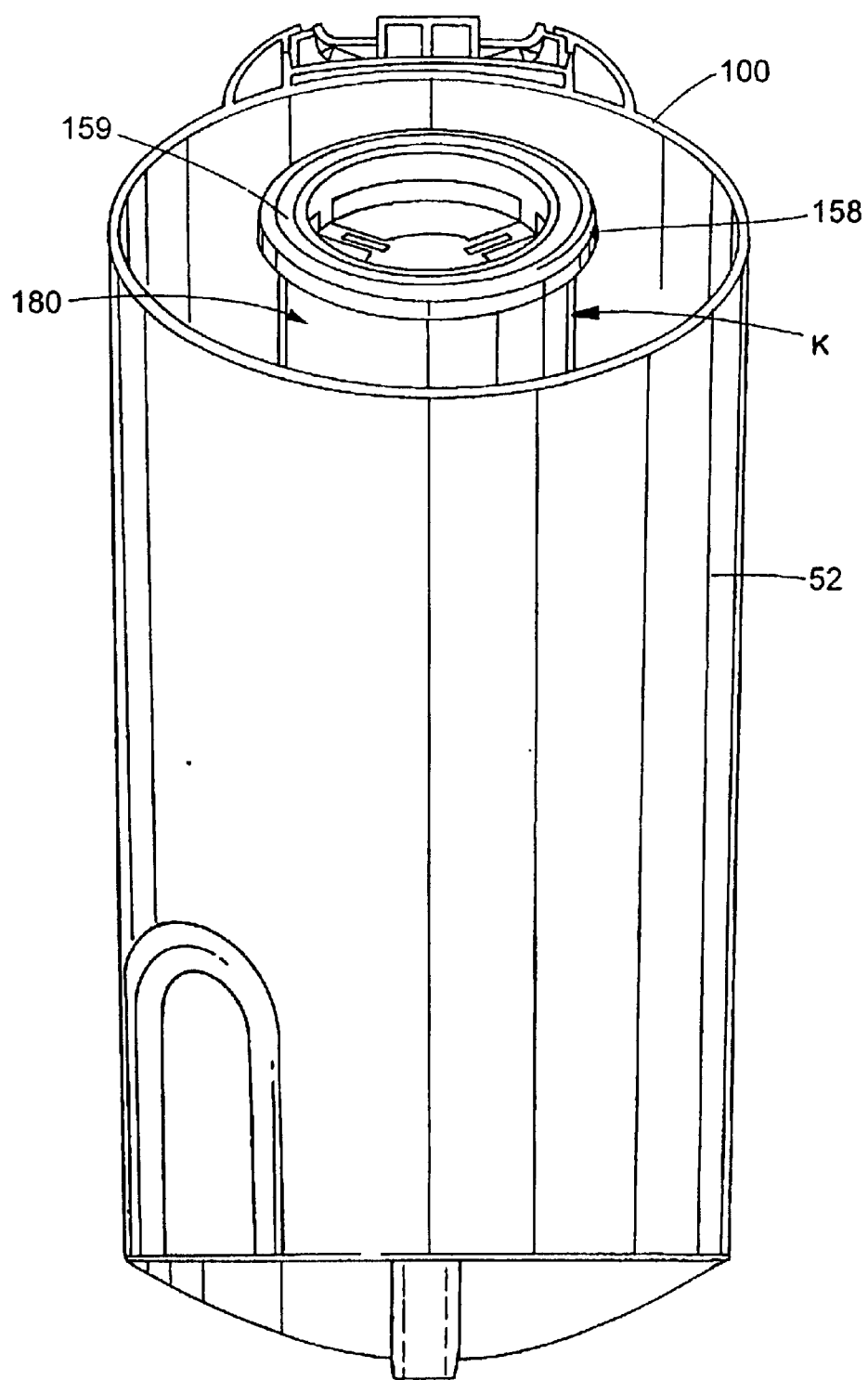
FIG. 14 is a rear elevational view of the dirt cup, main filter assembly, and filter mount means of FIG. 13 in an assembled condition.

The dirt cup 52 is shown in further detail in FIGS. 13 and 14. It includes a main filter support such as a post, stem, or like structure 150 projecting upwardly from a floor or base 152. The floor 152 of the filter support also defines the floor of the dirt cup 52 when the main filter support is seated and suitably secured in the dirt cup. When the main filter support is operatively positioned in the dirt cup 52, the post 150 is centrally positioned in the cyclonic airflow chamber 54 defined by the upper housing member 50 and the dirt cup 52 on a central axis 81.

A hollow, cylindrical main filter assembly K is positioned over the main filter support 150. The filter assembly K is engaged in an interference fit with vanes 154 and/or a disc-like plateau or boss 156 located on the floor 152 of the filter support so that the filter assembly K is releasably, yet securely, retained in its operative position as shown herein, even when the dirt cup 52 is removed from the vacuum cleaner and inverted for purposes of emptying the contents thereof. An upper filter ring 158, accommodating a gasket 159, is provided along the uppermost edge of a main filter medium membrane 180, and the main filter assembly K extends upwardly from the floor 152 to a level approximately equal to an upper edge 100 of the dirt cup 52. Most preferably, the uppermost edge of the main filter assembly K as defined by the ring 158 is also sloped in the same manner as is the dirt cup upper edge 100. Over the entire height of the dirt cup 52, an annular cyclonic airflow passage is defined between the main filter assembly K and the surrounding portion of the dirt cup 52.

Figure 15:
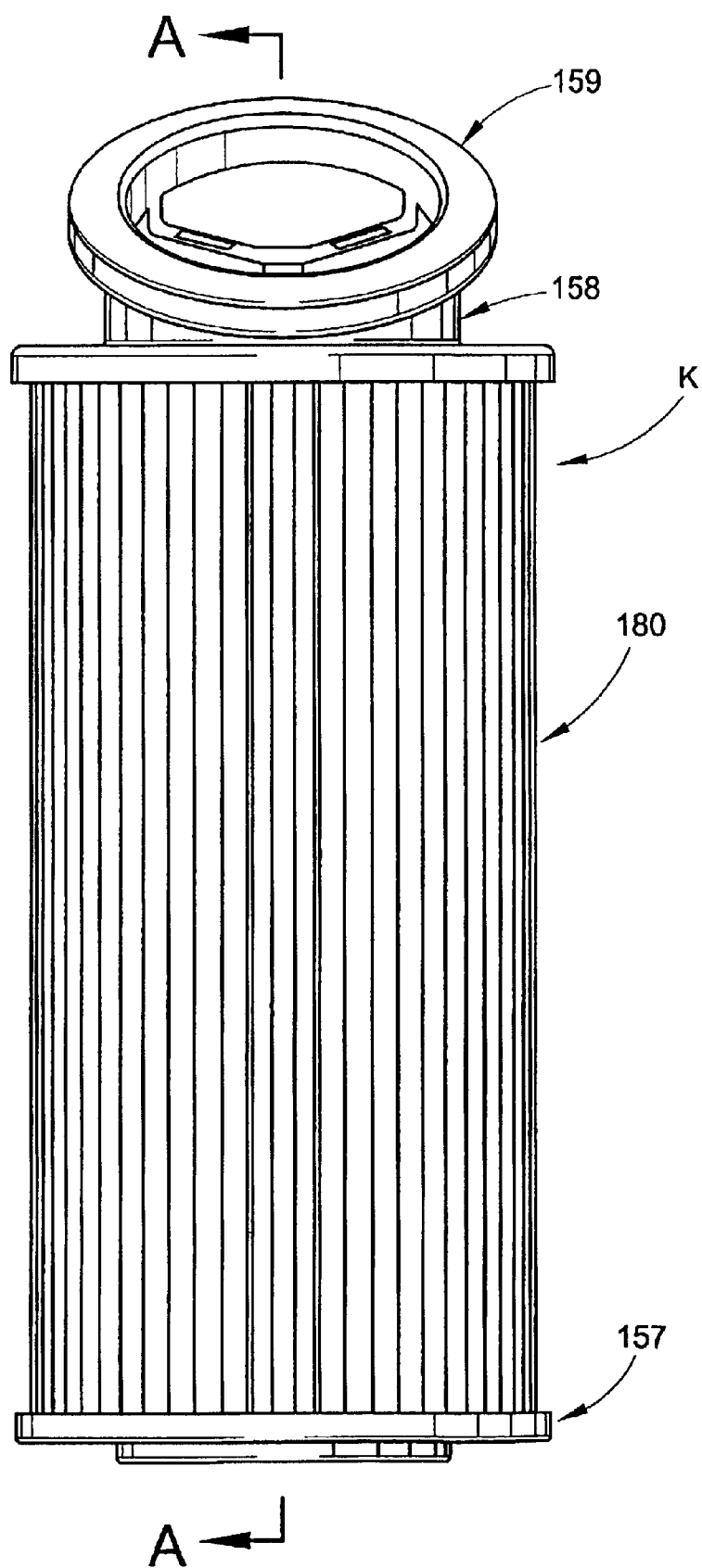
FIG. 15 is a rear elevational view of a preferred main filter assembly formed in accordance with the present invention; and, FIG. 16 is a view taken along line A—A of FIG. 15.
Figure 16:
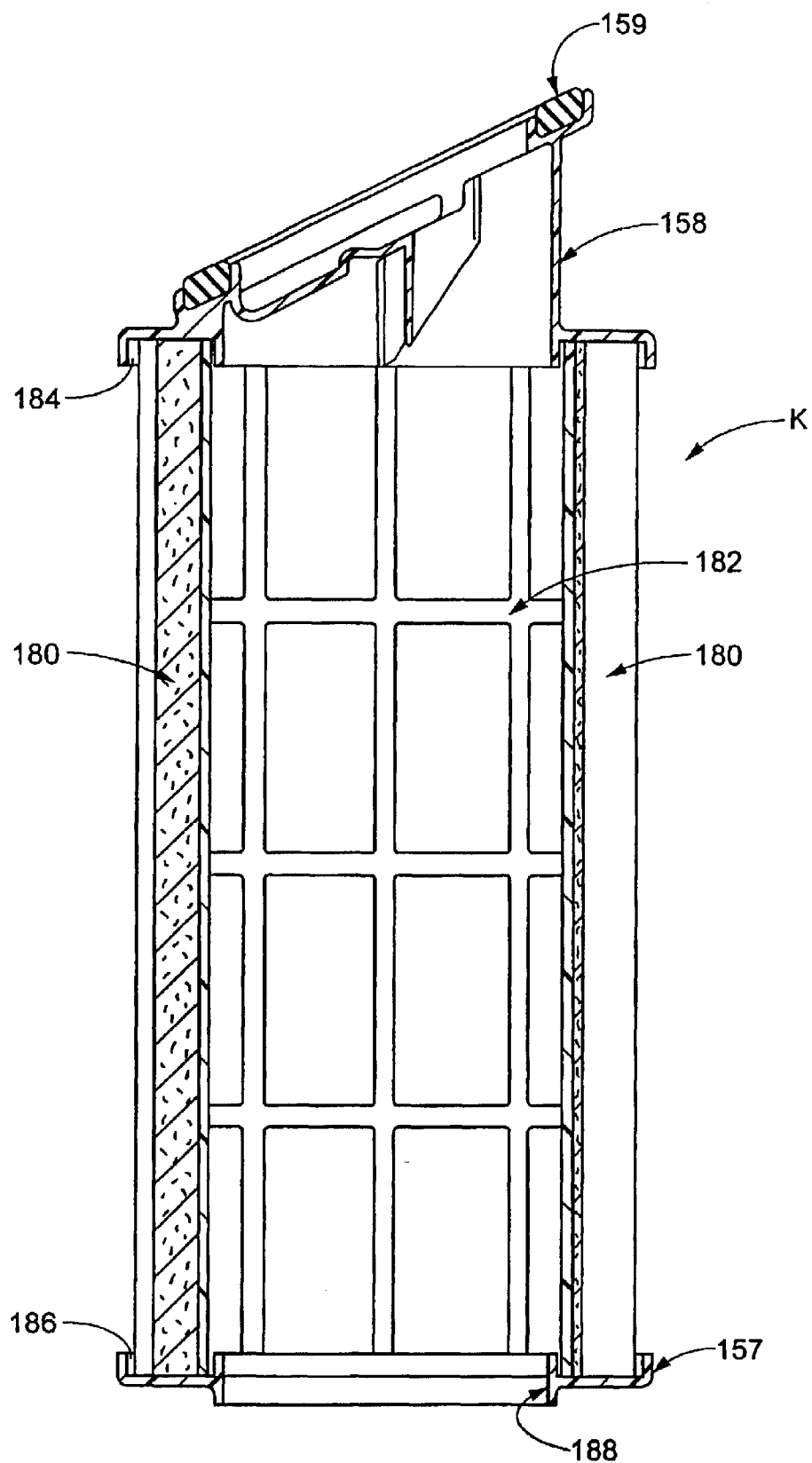

A preferred embodiment of the main filter assembly K is illustrated in further detail in FIGS. 15 and 16. The main filter medium membrane 180 is defined in a hollow, tubular, cylindrical form from a planar, pleated filter membrane. An upper end of the pleated membrane 180 is seated in an annular groove 184 defined by the upper filter ring 158. Likewise, a lower end of the pleated filter membrane 180 is seated in an annular groove 186 defined by a lower filter ring 157. The rings 157,158 are preferably defined from molded plastic, and the lower ring 157 defines an aperture 188 that closely receives the boss 156 projecting from the filter support floor 152 with a tight, friction fit. The upper filter ring 158 is conformed in a manner so that, when the dirt cup 52 is in its closed position, the gasket 159 mates in a fluid-tight manner with the entire peripheral extent of the lowermost edge 166 of an upper conduit 160 (FIG. 9) depending into the cyclonic chamber 54 from the upper housing member 50 so as to prevent undesired airflow through an axial space between the depending conduit 160 and the filter assembly K. The pleated filter membrane 180 is internally supported on an open frame structure 182 that extends axially between and interconnects the lower and upper filter rings 157,158. The open frame structure 182 does not impede airflow through the pleated filter element 180, but ensures that the filter element will not collapse under the force of the suction airstream J.

A preferred medium for the filter membrane 180 comprises polytetrafluoroethylene (PTFE), a polymeric, plastic material commonly referred to by the registered trademark TEFLON®. The low coefficient of friction of a filter medium comprising PTFE facilitates cleaning of the filter element by washing. Most preferably, the pleated filter medium 180 is defined substantially or entirely from GORE-TEX®, a PTFE-based material commercially available from W. L. GORE & ASSOCIATES, Elkton, Md. 21921. The preferred GORE-TEX® filter medium, also sold under the trademark CLEANSTREAM® by W. L. GORE & ASSOCIATES, is an expanded PTFE membrane defined from billions of continuous, tiny fibrils. The filter blocks the passage of at least 99% of particles 0.3 $\mu$m in size or larger. Although not visible in the drawings, the inwardly and/or outwardly facing surface of the CLEANSTREAM® filter membrane 180 is preferably coated with a mesh backing material of plastic or the like for durability since it enhances the abrasion-resistance characteristics of the plastic filter material. The mesh may also enhance the strength of the plastic filter material somewhat.

Figure 10:
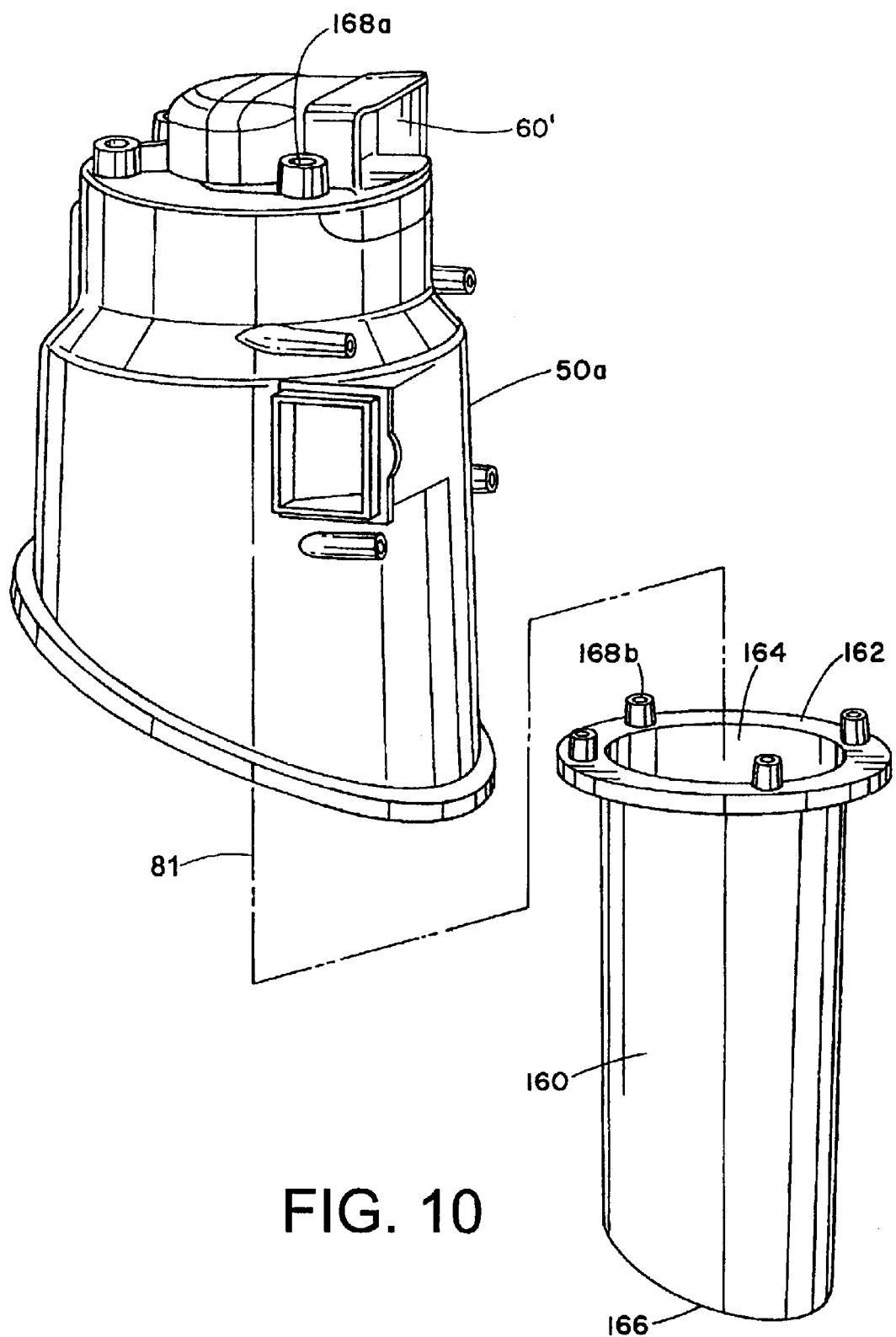
FIG. 10 is an exploded perspective view of an upper housing member and associated depending upper conduit of the vacuum cleaner of FIG. 9.
Figure 11:
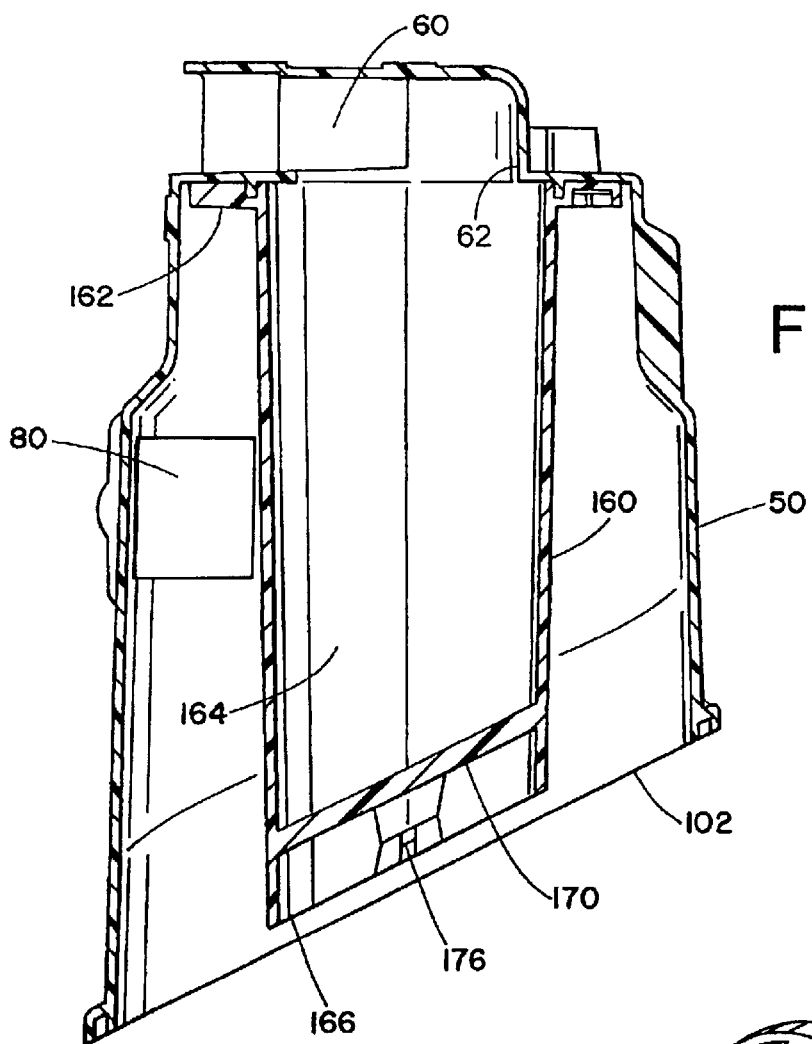
FIG. 11 is a cross-sectional view of the assembled upper housing member and conduit of FIG. 10.
Figure 12:
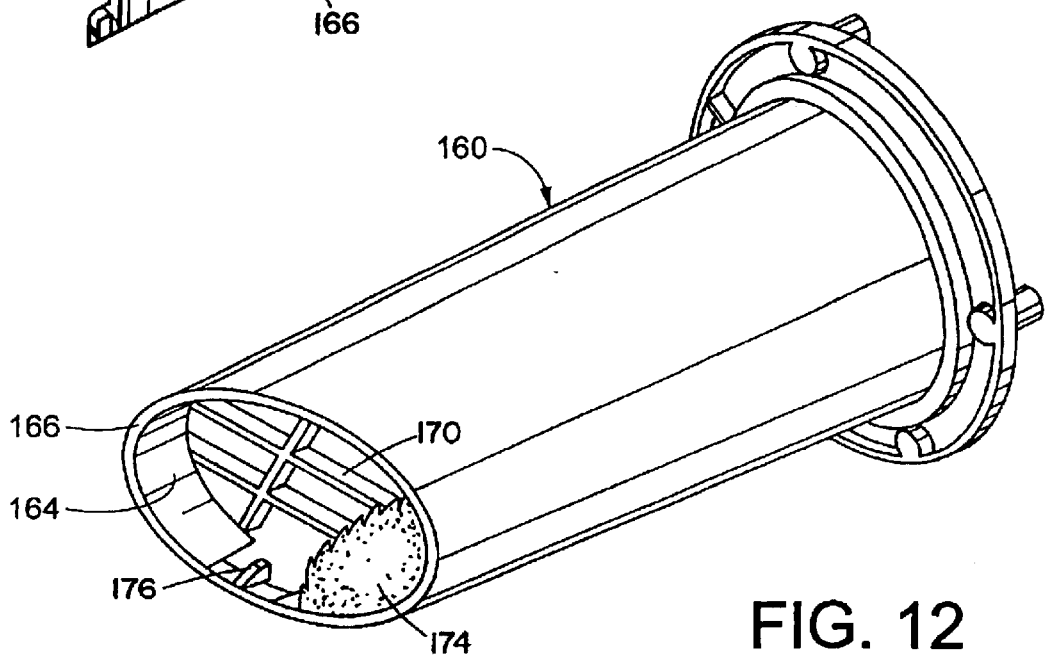
FIG. 12 is a perspective view of the upper conduit of FIG. 10.

Referring now also to FIGS. 10–12, the relationship of the upper housing member 50 and the depending upper conduit 160 is described. The conduit 160 projects centrally downwardly into the chamber 54 from a top wall 162 of the housing member 50. The upper conduit 160 is preferably a hollow cylindrical member with a bore 164 extending therethrough. The bore 164 is in fluid communication with the suction airstream outlet passage 60 through which the suction airflow J exits the cyclonic airflow chamber 54. The conduit 160 projects downwardly from the housing top wall 162 so that the lowermost edge 166 thereof is approximately equal to the level of the lower edge 102 of the housing ember 50. Also, the lower edge 166 is sloped in a manner that corresponds to the slope of the housing member lower edge 102. The upper conduit 160 is connected to the upper housing member 50 by any suitable means such as fasteners engaged in aligned bores 168a, 168b (FIG. 10) respectively formed in the housing member 50 and conduit 160. As mentioned, the gasket 159 is provided along the joint between the lowermost edge 166 of the upper conduit 160 and the upper edge of the filter assembly K.

With reference now specifically to FIG. 12, an auxiliary filter support grid or framework 170 is provided and extends across the bore 164, preferably in the region of the conduit lower edge 166. The open filter support 170 provides a backing member for a foam, paper, or similar conventional auxiliary filter element 174 that removes any residual dust and dirt from the suction airstream J prior to its exit from the cyclonic airflow chamber 54 through the bore 164 and outlet passage 60. In case there is a break in the seal between the filter assembly K and the conduit 160, the auxiliary filter 174 will prevent dirt or dust from being sucked into the motor/fan assembly E of the vacuum cleaner A. One or more tabs or teeth 176 project radially inwardly from the conduit 160 in the region of the framework 170 to engage the auxiliary filter element 174 so that the filter element is secured adjacent the framework 170 and will not be dislodged from its operative position by the force of gravity.

As is most readily apparent in FIG. 9, the main filter assembly K and the upper conduit 160 together define a hollow cylindrical column extending through the center of the cyclonic airflow chamber 54 entirely between the floor 152 and top wall 162. This preferred cylindrical columnar shape also results from the main filter assembly K and the upper conduit 160 having substantially the same outside diameter.

The suction airstream J established and maintained by the motor/fan assembly E enters an upper portion of the cyclonic dust and dirt separation chamber 54 through a generally tangential or offset suction airstream inlet 80 that is preferably horizontally oriented. In the preferred embodiment, as may be seen most clearly with reference to FIGS. 10 and 11, the cyclonic chamber airstream inlet 80 is formed in the upper housing member 50, and it is noted that the inlet 80 is disposed entirely on one side of a centerline 81 of the upper housing section so as to induce a swirling flow in the chamber 54. As shown in FIG. 5, the suction airstream inlet 80 is in fluid communication with a suction airstream hose 82 through a fitting 84, and the airstream hose 82 is, itself, fluidically connected with the main suction opening 26 formed in the underside of the nozzle base C by way of the conduit 34 and a fitting 86. As such, the main suction opening 26 is in fluid communication with the cyclonic chamber 54 through the passage 30, the hoses 34,82, and the cyclonic chamber suction inlet 80.

Figure 8:
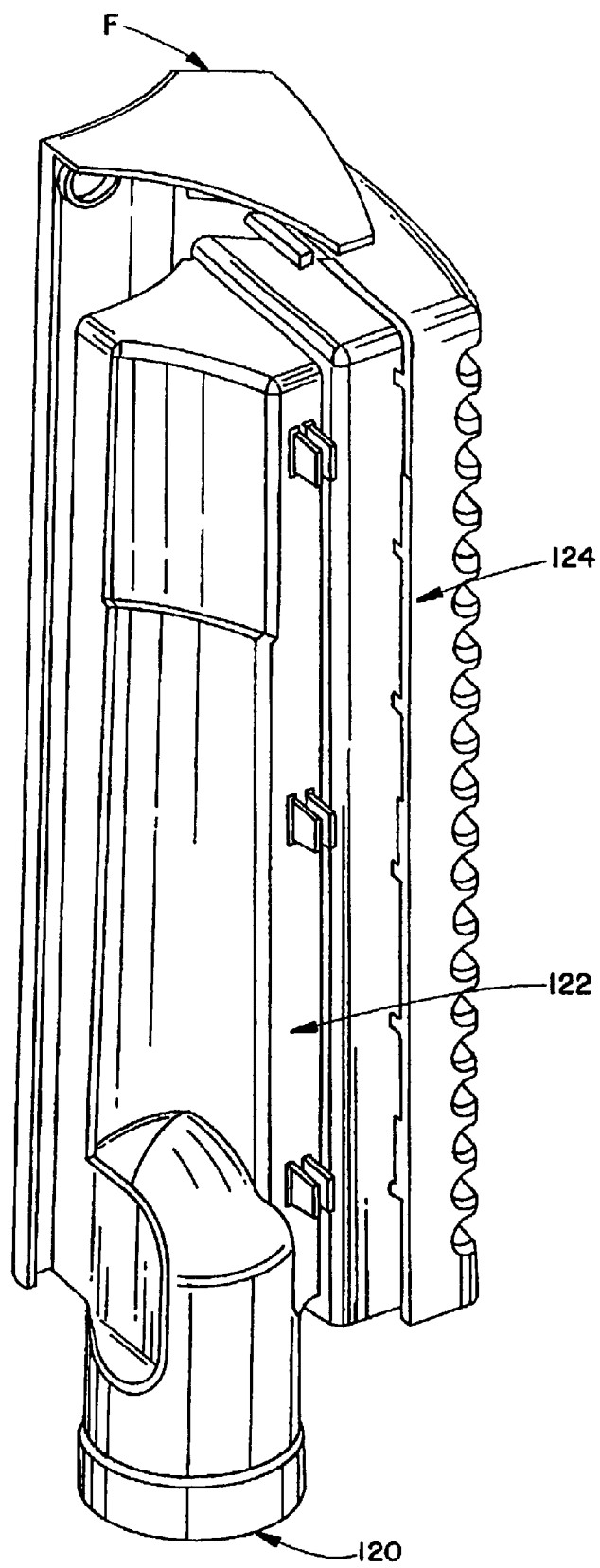
FIG. 8 is a perspective view of the final filter assembly in accordance with the present invention.

The vacuum A also comprises a final filter assembly F (see e.g., FIGS. 1–3 and 5) adapted for filtering the suction airstream downstream from the motor/fan assembly and immediately prior to its exhaustion into the atmosphere. A preferred structure of the final filter assembly F is illustrated most clearly in FIG. 8 and comprises a suction airstream inlet 120 which is connected downstream and in fluid communication with the exhaust outlet 42 of the motor and fan assembly E. The inlet 120 communicates with an elongated plenum 122 that opens to the atmosphere and houses a filter medium. A protective grid or grate structure 124 is snap-fit or otherwise effectively secured over the plenum 122 to secure the filter medium in place. The filter medium is preferably a high efficiency particulate arrest (HEPA) filter element in a sheet or block form. The filter medium is retained in position in the plenum by the grid 124, but is easily replaced by removing the grid. As such, those skilled in the art will recognize that even if the motor/fan assembly causes contaminants to be introduced into the suction airstream downstream from the main filter element H, the final filter assembly F will remove the same such that only contaminant-free air is discharged into the atmosphere.

Referring now primarily to FIGS. 5 and 9, the operation of the vacuum cleaning apparatus A is illustrated, with the flow of the suction airstream indicated by use of arrows J. The motor/fan assembly E or other suction generator establishes a suction force at its suction inlet 40, in the elongated suction conduit 46, and thus in the cyclonic separation chamber 54. This suction force or negative pressure in the chamber 54 is communicated to the main suction opening 26 formed in the nozzle underside 24 through the hoses 82,34 and associated fittings. This, then, in combination with the scrubbing action of the rotating brush assembly 36 causes dust and dirt from the surface being cleaned to be entrained in the suction airflow J and pulled into the upper portion of the chamber 54 through the generally tangential inlet 80.

As the suction airstream J enters the cyclonic chamber 54 through the inlet 80, it travels downwardly in a cyclonic fashion so that a portion of the dust and dirt entrained in the suction airstream are separated therefrom and collected in the dirt cup 52 (as indicated at L). The suction airstream J then passes through the main filter assembly K to remove residual contaminants therefrom, and moves upwardly through the main filter element K, through the auxiliary filter element 174, and into the bore 164 of the depending conduit 160. The airstream J is prevented from bypassing the main filter element K by the gasket 159 positioned axially between the filter assembly K and the conduit 160. The airstream J then exits the cyclonic airflow chamber 54 through the outlet passage 60 and moves downwardly through the conduit 46 to the inlet 40 of the motor/fan assembly E and is then exhausted through the motor exhaust outlet 42 to the final filter assembly F where it is filtered again by the HEPA filter to remove any contaminants that passed through the chamber 54, the main filter assembly K, the auxiliary filter 174, and also any contaminants introduced into the airstream by the motor/fan assembly E, itself.

The position of the main filter assembly K, extending upwardly from the floor 152, is highly desirable given that, as dust and dirt L are collected, at least a portion M of the suction airstream passes through the accumulated dust and dirt L. The accumulation of dust and dirt L seems to act as yet another filter element which filters more dust and dirt from the airstream M. Also, the flow of the suction airstream M downwardly through the accumulated dust and dirt L acts to compact the dust and dirt L downwardly toward the floor 152 so that the capacity of the dirt cup 52 is efficiently utilized to extend the time before the dirt cup must be emptied. As noted, a main advantage of the present invention is that the main filter assembly K can be cleaned by washing it, either manually or in a dishwasher—since it is dishwasher-safe—to remove dust or dirt particles adhering to the filter element.

The orientation of the inlet 80 will affect the direction of cyclonic airflow, and the invention is not meant to be limited to a particular direction, i.e, clockwise or counterclockwise. Those skilled in the art will certainly recognize that the term "cyclonic" as used herein is not meant to be limited to a particular direction of airflow rotation. This cyclonic action separates a substantial portion of the entrained dust and dirt from the suction airstream and causes the dust and dirt to be deposited in the dirt cup or container.

The invention has been described with reference to the preferred embodiments. Obviously, modifications and alterations will occur to others upon reading and understanding the preceding detailed description. It is intended that the invention be construed as including all such modifications and alterations insofar as they come within the scope of the appended claims or the equivalents thereof.

What is claimed is:

1. An upright vacuum cleaner comprising:
   an upright housing comprising:
      a dirt separation chamber for separating contaminants from an airstream, said dirt separation chamber including an airstream inlet and an airstream outlet, and
      a dirt cup selectively removable from a socket defined in said upright housing, said dirt cup communicating with said dirt separation chamber;
   a nozzle base pivotably connected to said upright housing and including a main suction opening, said main suction opening being fluidically connected with said dirt separation chamber;
   an airstream source for generating a cyclonic flow of the airstream in the dirt separation chamber; and,
   a selectively removable main filter assembly disposed in the dirt separation chamber to cover said airstream outlet, and wherein said cyclonic flow of the airstream circulates about at least a portion of said main filter assembly prior to said airstream exiting said chamber.

2. The upright vacuum cleaner of claim 1 wherein said dirt cup comprises a handle.

3. The upright vacuum cleaner of claim 1 wherein said airstream source is located below said dirt separation chamber.

4. The upright vacuum cleaner of claim 1 further comprising:
   a hinge operative to pivotably connect said upright housing and said nozzle base.

5. The upright vacuum cleaner of claim 4 wherein said airstream source is disposed adjacent to said hinge.

6. The upright vacuum cleaner of claim 1 wherein said filter assembly comprises an open frame structure operative to support a filter element of said filter assembly.

7. The upright vacuum cleaner of claim 6 wherein said filter element comprises a thermoplastic material.

8. An upright vacuum cleaner comprising:
   a base portion;
   a rotating brush assembly included in the base portion;
   an upright housing section hingedly connected to the base portion;
   a cyclonic separator located in said upright housing section, the cyclonic separator having a tangential inlet and an outlet, and wherein an airflow in the cyclonic separator comprises a cyclonically flowing airstream;
   a suction source for generating the airflow;
   a dirt cup selectively mounted to said upright housing section and communicating with said cyclonic separator; and,
   a filter assembly disposed in the upright housing above the suction source.

9. The upright vacuum cleaner of claim 8 further comprising a conduit interconnecting the outlet with the suction source.

10. The upright vacuum cleaner of claim 8 wherein the upright housing section comprises a socket for receiving the dirt cup.

11. The upright vacuum cleaner of claim 8 further comprising an auxiliary filter fluidically disposed between the cyclonic separator outlet and the suction source.

12. The upright vacuum cleaner of claim 8 further comprising a final filter fluidically disposed to filter air received from an exhaust side of the suction source.

13. The upright vacuum cleaner of claim 8 wherein the filter assembly comprises an open frame structure operative to support a filter element of the filter assembly.

14. The upright vacuum cleaner of claim 8 wherein the filter assembly includes a filter element that comprises a thermoplastic material.

15. A vacuum cleaner comprising:
   a removable dirt cup;
   a cyclonic chamber communicating with the dirt cup, the cyclonic chamber including an air flow inlet and an air flow outlet;
   a first housing member holding the cyclonic chamber, said first housing member comprising a socket for selectively receiving the dirt cup;
   a main suction opening connected to the first housing member and communicating with the air flow inlet of the cyclonic chamber;
   an airstream drive having an airstream inlet and an airstream outlet;
   a conduit for fluidically connecting the air flow outlet of the cyclonic chamber to the airstream inlet of the airstream drive; and,
   a main filter assembly disposed in the cyclonic chamber so that an airstream moving from said air flow inlet of said cyclonic chamber to the airstream inlet of the airstream drive passes through said main filter assembly.

16. The vacuum cleaner as set forth in claim 15 wherein the main filter assembly comprises a cylindrical filter element.

17. The vacuum cleaner as set forth in claim 16 herein the filter element is supported on an internal open framework cylindrical support structure.

18. The vacuum cleaner as set forth in claim 15 wherein the dirt cup is held in place within the housing by a releasable latch.

19. The vacuum cleaner as set forth in claim 15 wherein the air flow inlet is horizontally oriented and arranged so that the airstream flowing through the air flow inlet flows around the main filter assembly.

20. The vacuum cleaner as set forth in claim 19 further comprising:

an auxiliary filter located upstream relative to the airstream inlet of the airstream drive and downstream relative to the main filter assembly, the auxiliary filter adapted for filtering residual contaminants from the airstream exiting the cyclonic chamber prior to the residual contaminants entering said airstream inlet of said airstream drive.

21. A vacuum cleaner comprising:

a removable dirt cup;

a cyclonic chamber communicating with the dirt cup, the cyclonic chamber including an air flow inlet and an air flow outlet;

a first housing member holding the cyclonic chamber and selectively receiving the dirt cup;

an airstream drive having an airstream inlet and an airstream outlet, the airstream drive operative to generate and maintain the airstream flowing from the airstream inlet to said airstream outlet, said airstream drive being located in said first housing member beneath said dirt cup; and, a main filter assembly disposed in the cyclonic chamber so that the airstream moving from said air flow inlet of the cyclonic chamber to the airstream inlet of the airstream drive passes through the main filter assembly after at least a portion of entrained dirt in the airstream is separated therefrom by cyclonic airflow.

22. The vacuum cleaner as set forth in claim 1 wherein the main filter assembly comprises a cylindrical filter element.

23. The vacuum cleaner as set forth in claim 21 wherein the filter element is supported on an internal open framework cylindrical support structure.

24. The vacuum cleaner as set forth in claim 21 wherein the dirt cup is held in place within said housing member by a releasable latch.

25. The vacuum cleaner as set forth in claim 1 wherein the air flow inlet of the cyclonic chamber is horizontally oriented and arranged so that the airstream flowing through said inlet flows around said main filter assembly.

26. The vacuum cleaner as set forth in claim 21 further comprising:

an auxiliary filter located upstream relative to the airstream inlet and downstream relative to the main filter assembly, the auxiliary filter adapted for filtering residual contaminants from an airstream exiting the cyclonic chamber prior to said residual contaminants entering the airstream inlet of the airstream drive.

27. The vacuum cleaner as set forth in claim 21 further comprising:

a final filter located downstream relative to the airstream outlet, the final filter adapted for filtering remaining contaminants from an airstream exiting the airstream drive.

* * * * *

UNITED STATES PATENT AND TRADEMARK OFFICE
CERTIFICATE OF CORRECTION

PATENT NO. : 6,745,432 B2
DATED : June 8, 2004
INVENTOR(S) : Michael F. Wright et al.

It is certified that error appears in the above-identified patent and that said Letters Patent is hereby corrected as shown below:

<u>Title page,</u>
Item [*] Notice, please insert the following new paragraph:
-- This patent is subject to a terminal disclaimer. --

<u>Column 10,</u>
Line 22, after "source", insert -- , wherein said cyclonic separator is located in a chamber defined in said upright housing, said filter assembly being disposed in said chamber. --
Line 32, delete "claim 8" and insert -- claim 11 -- therefor.

Signed and Sealed this

Twenty-third Day of November, 2004

JON W. DUDAS
*Director of the United States Patent and Trademark Office*